US012646439B2

(12) United States Patent
Shih et al.

(10) Patent No.: US 12,646,439 B2
(45) Date of Patent: Jun. 2, 2026

(54) DISPLAY DEVICE, DISPLAY DRIVING INTEGRATED CIRCUIT, AND OPERATING METHOD OF DISPLAY DRIVING INTEGRATED CIRCUIT

(71) Applicant: Novatek Microelectronics Corp., Hsinchu (TW)

(72) Inventors: Wei-Lun Shih, Hsinchu City (TW); Wen-Kai Hsieh, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/652,796

(22) Filed: May 1, 2024

(65) Prior Publication Data

US 2025/0218336 A1 Jul. 3, 2025

(30) Foreign Application Priority Data

Dec. 28, 2023 (TW) ................................ 112151264

(51) Int. Cl.
*G09G 3/20* (2006.01)

(52) U.S. Cl.
CPC ..... *G09G 3/2096* (2013.01); *G09G 2330/021* (2013.01); *G09G 2370/00* (2013.01)

(58) Field of Classification Search
CPC ........... G09G 3/2096; G09G 2330/021; G09G 2370/00
See application file for complete search history.

(56) References Cited

U.S. PATENT DOCUMENTS 6,172,711 B1 * 1/2001 Masumoto ................ H03L 7/18 348/537
10,380,934 B2 8/2019 Kim et al.
(Continued)

FOREIGN PATENT DOCUMENTS

CN 108665840 10/2018
CN 114495805 5/2022
(Continued)

OTHER PUBLICATIONS

"Office Action of Taiwan Counterpart Application", issued on Dec. 6, 2024, p. 1-p. 6.

*Primary Examiner* — Towfiq Elahi
(74) *Attorney, Agent, or Firm* — JCIPRNET

(57) ABSTRACT

A display device, a display driving integrated circuit (IC), and an operating method of a display driving IC are provided. The display driving IC receives a data stream and an external horizontal synchronization signal from a processor, where the data stream includes display frame data, vertical synchronization information, and horizontal synchronization information. The display driving IC generates an internal vertical synchronization signal based on the vertical synchronization information and the horizontal synchronization information. The display driving IC dynamically updates a delay value based on a phase relationship among the vertical synchronization information, the horizontal synchronization information, and the external horizontal synchronization signal. The display driving IC delays the external horizontal synchronization signal based on the delay value to generate an internal horizontal synchronization signal. The display driving IC drives a display panel based on the display frame data, the internal vertical synchronization signal, and the internal horizontal synchronization signal.

20 Claims, 4 Drawing Sheets

(56) References Cited

U.S. PATENT DOCUMENTS

| | | | | |
|---|---|---|---|---|
| 11,238,779 | B1 * | 2/2022 | Maruyama | G09G 3/3275 |
| 11,551,642 | B2 | 1/2023 | Kim et al. | |
| 11,854,491 | B2 * | 12/2023 | Hatayama | G09G 3/3275 |
| 2004/0212609 | A1 * | 10/2004 | Igarashi | G09G 5/006<br>345/204 |
| 2006/0038810 | A1 | 2/2006 | Ebata et al. | |
| 2010/0066908 | A1 * | 3/2010 | Kitano | H04N 5/10<br>348/521 |
| 2018/0277034 | A1 | 9/2018 | Kim et al. | |
| 2022/0180841 | A1 * | 6/2022 | Kim | G06F 9/541 |
| 2023/0161455 | A1 | 5/2023 | Kim et al. | |
| 2023/0306913 | A1 | 9/2023 | Hatayama et al. | |

FOREIGN PATENT DOCUMENTS

| | | |
|---|---|---|
| CN | 114627810 | 6/2022 |
| TW | 200609899 | 3/2006 |

* cited by examiner

DISPLAY DEVICE, DISPLAY DRIVING INTEGRATED CIRCUIT, AND OPERATING METHOD OF DISPLAY DRIVING INTEGRATED CIRCUIT

CROSS-REFERENCE TO RELATED APPLICATION

This application claims the priority benefit of Taiwan application serial no. 112151264, filed on Dec. 28, 2023. The entirety of the above-mentioned patent application is hereby incorporated by reference herein and made a part of this specification.

BACKGROUND

Technical Field

The disclosure relates to an electronic device and particularly relates to a display device, a display driving integrated circuit (IC), and an operating method of a display driving IC.

Description of Related Art

An application processor (AP) is able to load display frame data, vertical synchronization information, and horizontal synchronization information into a data stream and subsequently provide the data stream to a display driving integrated circuit (IC) through a data lane of a mobile industry processor interface (MIPI). The vertical synchronization information may be a vertical sync start marker as defined by an MIPI standard, while the horizontal synchronization information may be a horizontal sync start marker defined by the MIPI standard. The display driving IC may drive a display panel based on display frame data, the vertical synchronization information, and the horizontal synchronization information provided by the AP.

SUMMARY

The disclosure provides a display device, a display driving integrated circuit (IC), and an operating method of a display driving IC to drive a display panel.

According to an embodiment of the disclosure, the display driving IC includes an interface circuit, a synchronization signal generating circuit, and a driving circuit. The interface circuit receives a data stream and an external horizontal synchronization signal from a processor, where the data stream includes display frame data, vertical synchronization information, and horizontal synchronization information. The synchronization signal generating circuit is coupled to the interface circuit to receive the vertical synchronization information, the horizontal synchronization information, and the external horizontal synchronization signal. The synchronization signal generating circuit generates an internal vertical synchronization signal based on the vertical synchronization information and the horizontal synchronization information. The synchronization signal generating circuit dynamically updates a delay value based on a phase relationship among the vertical synchronization information, the horizontal synchronization information, and the external horizontal synchronization signal. The synchronization signal generating circuit delays the external horizontal synchronization signal based on the delay value to generate an internal horizontal synchronization signal. The driving circuit is coupled to the interface circuit to receive the display frame data and coupled to the synchronization signal generating circuit to receive the internal vertical synchronization signal and the internal horizontal synchronization signal. The driving circuit drives a display panel based on the display frame data, the internal vertical synchronization signal, and the internal horizontal synchronization signal.

According to an embodiment of the disclosure, the operating method of the display driving IC includes following steps. A data stream and an external horizontal synchronization signal are received from a processor by an interface circuit of the display driving IC, where the data stream includes display frame data, vertical synchronization information, and horizontal synchronization information. An internal vertical synchronization signal is generated based on the vertical synchronization information and the horizontal synchronization information by a synchronization signal generating circuit of the display driving IC. A delay value is dynamically updated based on a phase relationship among the vertical synchronization information, the horizontal synchronization information, and the external horizontal synchronization signal by the synchronization signal generating circuit. The external horizontal synchronization signal is delayed based on the delay value by the synchronization signal generating circuit to generate an internal horizontal synchronization signal. A display panel is driven based on the display frame data, the internal vertical synchronization signal, and the internal horizontal synchronization signal by a driving circuit of the display driving IC.

According to an embodiment of the disclosure, the display device includes a processor, a display driving IC, and a display panel. The display driving IC is coupled to the processor to receive a data stream and an external horizontal synchronization signal, where the data stream includes display frame data, vertical synchronization information, and horizontal synchronization information. The display driving IC generates an internal vertical synchronization signal based on the vertical synchronization information and the horizontal synchronization information. The display driving IC dynamically updates a delay value based on a phase relationship among the vertical synchronization information, the horizontal synchronization information, and the external horizontal synchronization signal, and the display driving IC delays the external horizontal synchronization signal based on the delay value to generate an internal horizontal synchronization signal. The display panel is coupled to the display driving IC, where the display driving IC drives the display panel based on the display frame data, the internal vertical synchronization signal, and the internal horizontal synchronization signal.

Based on the above, the display driving IC provided in one or more embodiments of the disclosure generates the internal horizontal synchronization signal through utilizing the external horizontal synchronization signal. Subsequently, the display driving IC employs the internal horizontal synchronization signal to drive the display panel. In the MIPI video mode, the display driving IC may utilize the internal horizontal synchronization signal to determine the timing of the next display frame. Therefore, within each display frame in the MIPI video mode, subsequent to the processor outputting data of a valid display frame (including the horizontal synchronization information of one frame) to the display driving IC, the processor discontinues the data stream (no longer outputting redundant horizontal synchronization information until the conclusion of one display frame). Since the processor does not need to output the redundant horizontal synchronization information, and correspondingly, the display driving IC does not have to receive and process (e.g., unpack) such redundant horizontal synchronization information, power consumption may be reduced. Moreover, the display driving IC is able to dynamically update the delay value of the internal horizontal synchronization signal based on the phase relationship between the horizontal synchronization information and the external horizontal synchronization signal. Consequently, the phase of the internal horizontal synchronization signal may be matched to the phase of the horizontal synchronization information provided by the processor.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DETAILED DESCRIPTION OF DISCLOSED EMBODIMENTS

Figure 1:
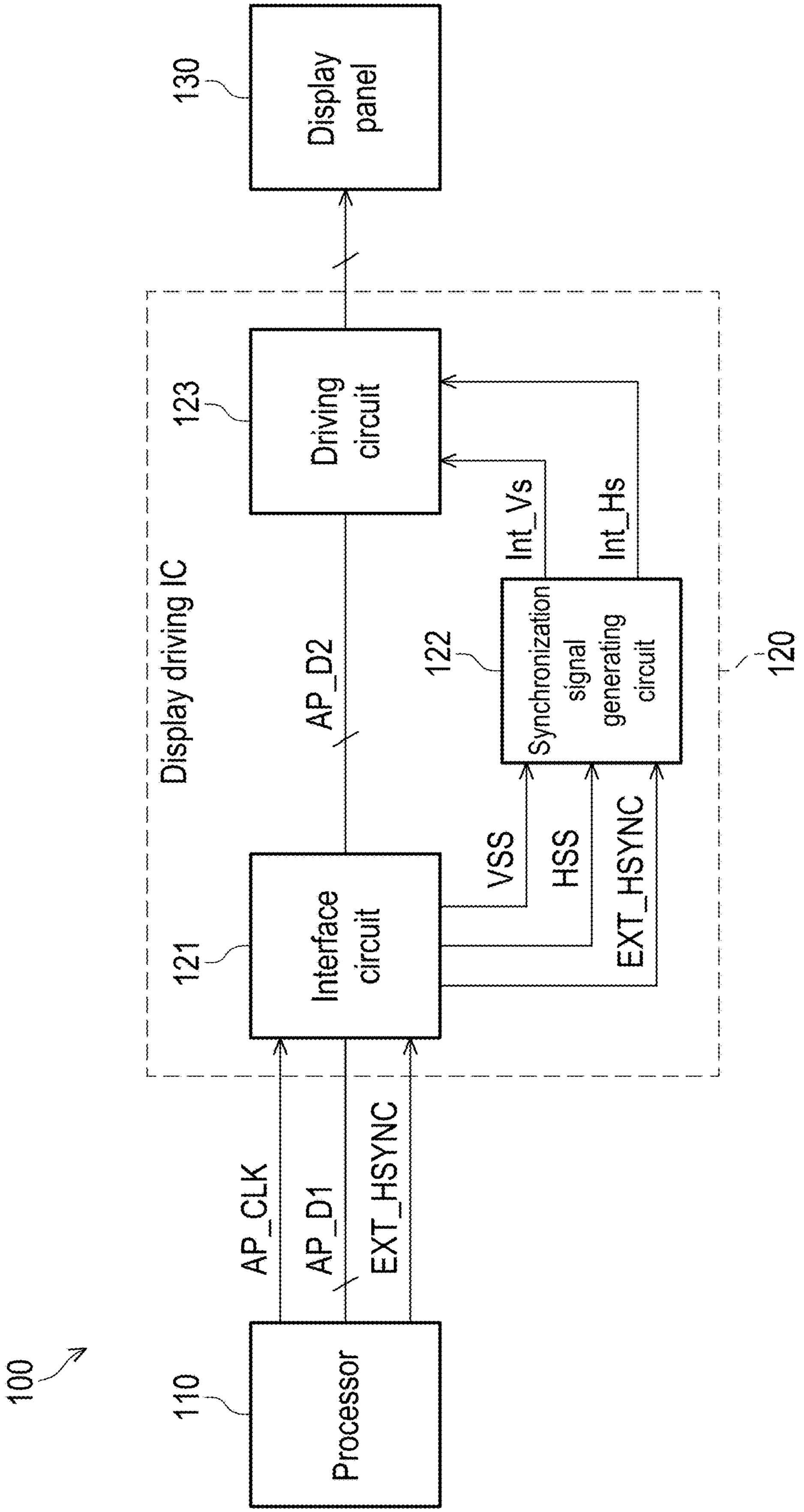
FIG. 1 is a schematic circuit block view of a display device according to an embodiment of the disclosure.

The terminology "couple (or connect)" used throughout the whole description of the disclosure (including the claims) may refer to any direct or indirect connection means. For instance, if the disclosure describes that a first device is coupled (or connected) to a second device, it should be interpreted that the first device may be directly connected to the second device, or that the first device may be indirectly connected to the second device through other devices or certain connection means. The terminologies such as "first" and "second" mentioned in the description of the disclosure (including the claims) are used to name different elements or to distinguish different embodiments or scopes and are not intended to limit the upper or lower limit of the number of the elements, nor are they intended to limit the manufacturing order or disposition order of the elements. Moreover, wherever possible, elements/components/steps with the same reference numbers in the drawings and the embodiments denote the same or similar parts. Cross-reference may be made to related descriptions of elements/components/steps with the same reference numbers or the same terminologies in different embodiments.

FIG. 1 is a schematic circuit block view of a display device 100 according to an embodiment of the disclosure. The display device 100 shown in FIG. 1 includes a processor 110, a display driving integrated circuit (IC) 120, and a display panel 130. The display driving IC 120 is coupled to the processor 110 to receive a data stream AP_D1 and an external horizontal synchronization signal EXT_HSYNC. The specific transmission method of the data stream AP_D1 is not limited in this embodiment. For instance (but not limited to what is described herein), the display driving IC 120 may receive a clock signal AP_CLK and the data stream AP_D1 from the processor 110 through a mobile industry processor interface (MIPI) or other interfaces. The display driving IC 120 may sample/latch data in the data stream AP_D1 based on the clock signal AP_CLK.

The display driving IC 120 may unpack the data stream AP_D1. The data stream AP_D1 includes display frame data AP_D2, vertical synchronization information VSS, and horizontal synchronization information HSS. The vertical synchronization information VSS may include a vertical sync start marker defined by the MIPI standard, and the horizontal synchronization information HSS may include a horizontal sync start marker defined by the MIPI standard. The display driving IC 120 may generate an internal vertical synchronization signal Int_Vs based on the vertical synchronization information VSS and the horizontal synchronization information HSS. Based on a phase relationship among the vertical synchronization information VSS, the horizontal synchronization information HSS, and the external horizontal synchronization signal EXT_HSYNC, the display driving IC 120 may dynamically determine/update a delay value. The display driving IC 120 may delay the external horizontal synchronization signal EXT_HSYNC based on the delay value to generate an internal horizontal synchronization signal Int_Hs. The display panel 130 is coupled to the display driving IC 120. The display driving IC 120 may drive the display panel 130 based on the display frame data AP_D2, the internal vertical synchronization signal Int_Vs, and the internal horizontal synchronization signal Int_Hs.

In the embodiment shown in FIG. 1, the display driving IC 120 includes an interface circuit 121, a synchronization signal generating circuit 122, and a driving circuit 123. According to different designs, in some embodiments, the processor 110, the display driving IC 120, the interface circuit 121, the synchronization signal generating circuit 122, and/or the driving circuit 123 may be implemented in form of a hardware circuit. In other embodiments, the processor 110, the display driving IC 120, the interface circuit 121, the synchronization signal generating circuit 122, and/or the driving circuit 123 may be implemented in form of firmware, software (i.e., programs), or a combination thereof. In some other embodiments, the processor 110, the display driving IC 120, the interface circuit 121, the synchronization signal generating circuit 122, and/or the driving circuit 123 may be a combination of hardware, firmware, and software.

In terms of hardware, functions in association with the processor 110, the display driving IC 120, the interface circuit 121, the synchronization signal generating circuit 122, and/or the driving circuit 123 may be performed in various logic blocks, modules, and circuits of one or more controllers, microcontrollers, microprocessors, application-specific ICs (ASIC), digital signal processors (DSP), field programmable gate arrays (FPGA), central processing units (CPU), and/or other processing units. The processor 110, the display driving IC 120, the interface circuit 121, the synchronization signal generating circuit 122, and/or the driving circuit 123 may be implemented to perform the associated functions in form of hardware circuits, e.g., various logic blocks, modules, and circuits in the ICs, by applying hardware description languages (e.g., Verilog HDL or VHDL) or other suitable programming languages.

In terms of software and/or firmware, the functions in association with the processor 110, the display driving IC 120, the interface circuit 121, the synchronization signal generating circuit 122, and/or the driving circuit 123 may be performed as programming codes. For instance, the processor 110, the display driving IC 120, the interface circuit 121, the synchronization signal generating circuit 122, and/or the driving circuit 123 may be implemented using general programming languages (such as C, C++, or assembly languages), or other suitable programming languages. The programming codes may be recorded/stored in a "non-transitory machine-readable storage medium". In some embodiments, the non-transitory machine-readable storage medium may include, for instance, a semiconductor memory and/or a storage device. An electronic device (such as a CPU, a controller, a microcontroller, or a microprocessor) may read and execute the programming codes from the non-transitory machine-readable storage medium, thereby performing the functions in association with the processor 110, the display driving IC 120, the interface circuit 121, the synchronization signal generating circuit 122, and/or the driving circuit 123.

Figure 2:
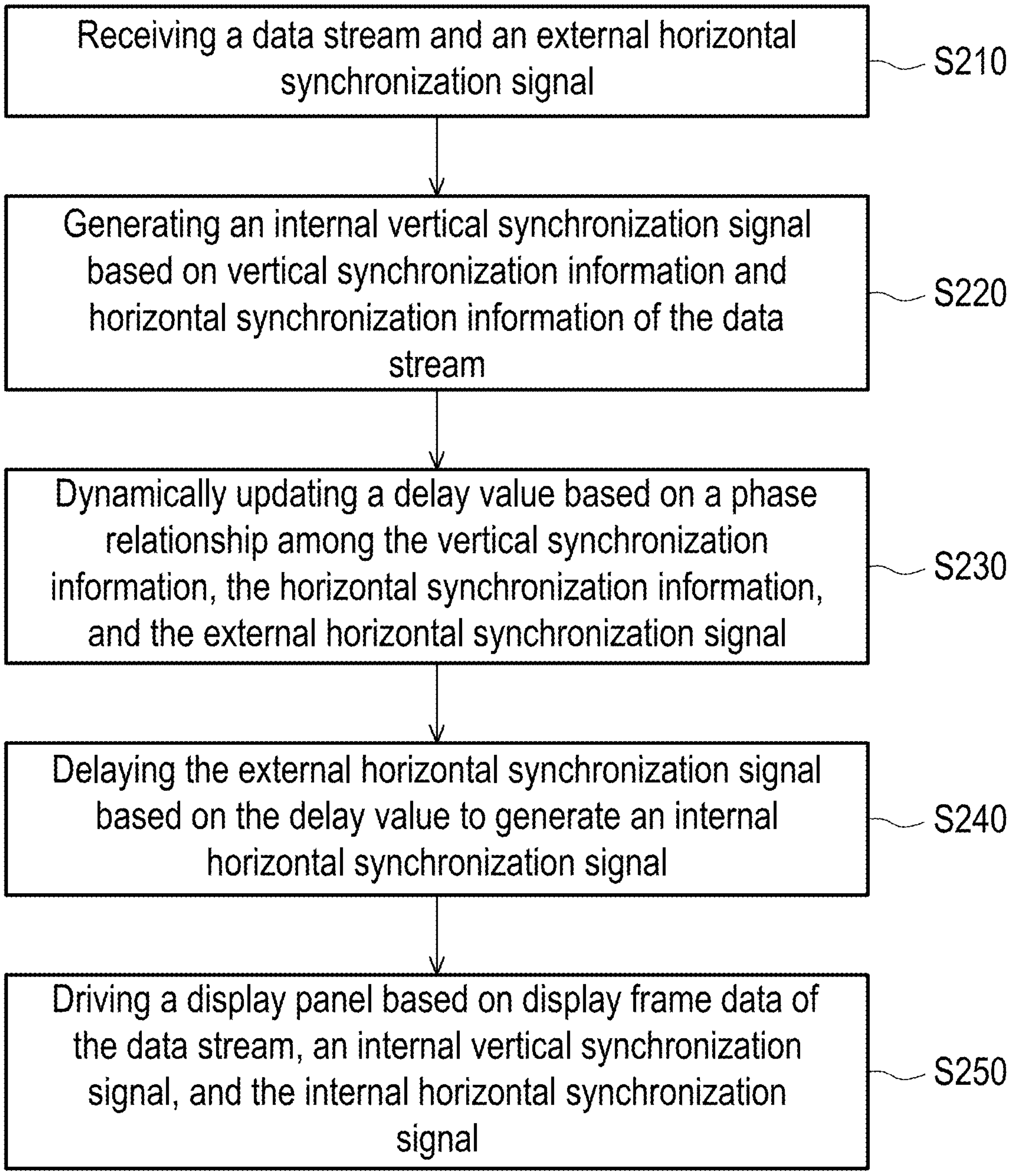
FIG. 2 is a schematic flowchart of an operating method of a display driving integrated circuit (IC) according to an embodiment of the disclosure.

FIG. 2 is a schematic flowchart of an operating method of a display driving IC 120 according to an embodiment of the disclosure. With reference to FIG. 1 and FIG. 2, in step S210, the interface circuit 121 may receive the data stream AP_D1 and the external horizontal synchronization signal EXT_HSYNC from the processor 110, where the data stream AP_D1 includes the display frame data, the vertical synchronization information, and the horizontal synchronization information. Based on the actual design, the interface circuit 121 may receive the clock signal AP_CLK and the data stream AP_D1 from the processor 110 via the MIPI interface or other interfaces. The interface circuit 121 may sample/latch the data in the data stream AP_D1 based on the clock signal AP_CLK. The data stream AP_D1 includes the display frame data AP_D2, the vertical synchronization information VSS, and the horizontal synchronization information HSS. The interface circuit 121 may unpack the data stream AP_D1 to output the display frame data AP_D2, the vertical synchronization information VSS, and the horizontal synchronization information HSS.

The synchronization signal generating circuit 122 is coupled to the interface circuit 121 to receive the vertical synchronization information VSS, the horizontal synchronization information HSS, and the external horizontal synchronization signal EXT_HSYNC. In step S220, the synchronization signal generating circuit 122 generates an internal vertical synchronization signal Int_Vs based on the vertical synchronization information VSS and the horizontal synchronization information HSS. In step S230, based on a phase relationship among the vertical synchronization information VSS, the horizontal synchronization information HSS, and the external horizontal synchronization signal EXT_HSYNC, the synchronization signal generating circuit 122 may dynamically determine/update a delay value. In step S240, the synchronization signal generating circuit 122 may delay the external horizontal synchronization signal EXT_HSYNC based on the delay value to generate an internal horizontal synchronization signal Int_Hs.

The driving circuit 123 is coupled to the interface circuit 121 to receive the display frame data AP_D2. The driving circuit 123 is further coupled to the synchronization signal generating circuit 122 to receive the internal vertical synchronization signal Int_Vs and the internal horizontal synchronization signal Int_Hs. In step S250, the driving circuit 123 may drive the display panel 130 based on the display frame data AP_D2, the internal vertical synchronization signal Int_Vs, and the internal horizontal synchronization signal Int_Hs. The implementation manner and the driving details of the display panel 130 should not be construed as limitations in this embodiment.

To sum up, the display driving IC 120 generates the internal horizontal synchronization signal Int_Hs by using the external horizontal synchronization signal EXT_HSYNC and then drives the display panel 130 by using the internal horizontal synchronization signal Int_Hs. In the MIPI video mode, the display driving IC 120 may count the internal horizontal synchronization signal Int_Hs to learn a timing of the next display frame. Therefore, in each display frame in the MIPI video mode, after the processor 110 outputs valid data of a display frame (including the horizontal synchronization information HSS of one frame) to the display driving IC 120, the processor 110 may pause the data transmission of the data stream (no longer outputting redundant horizontal synchronization information HSS) until the end of one display frame. Since the processor 110 does not need to output any redundant horizontal synchronization information HSS, and the display driving IC 120 does not need to receive and process (for instance, unpack) the redundant horizontal synchronization information HSS, power consumption may be reduced.

Figure 3:
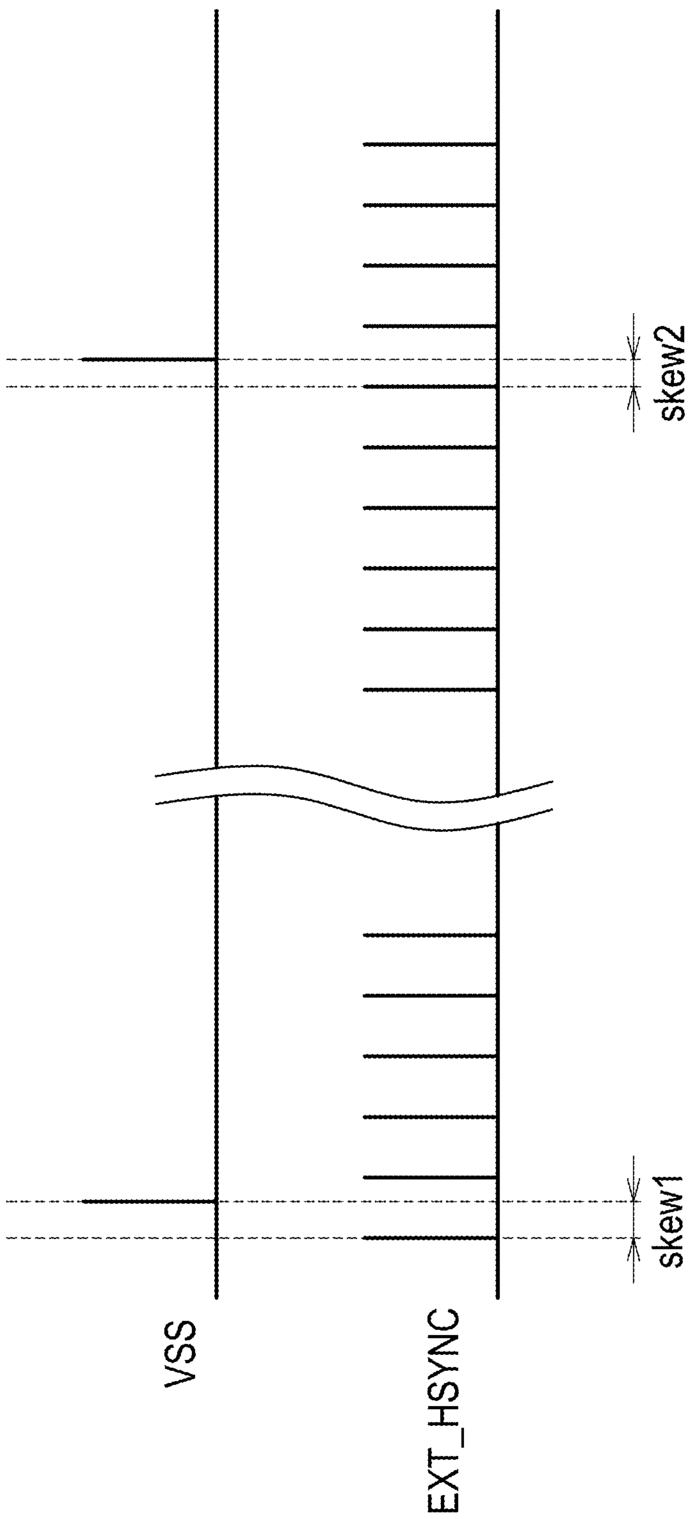
FIG. 3 is a schematic timing/phase view of vertical synchronization information and an external horizontal synchronization signal according to an embodiment of the disclosure.

FIG. 3 is a schematic timing/phase view of vertical synchronization information VSS and an external horizontal synchronization signal EXT_HSYNC according to an embodiment of the disclosure. With reference to FIG. 1 and FIG. 3, an upper portion of FIG. 3 illustrates two vertical synchronization time points of the vertical synchronization information VSS, where vertical lines represent the "vertical synchronization time points". The "vertical synchronization time points" may refer to time points at which the vertical sync start markers defined by the MIPI standard are located. A lower portion of FIG. 3 illustrates a plurality of external synchronization time points of the external horizontal synchronization signal EXT_HSYNC, where vertical lines represent the "external synchronization time points". According to the actual design, in some embodiments, the "external synchronization time points" may refer to rising edge time points of the external horizontal synchronization signal EXT_HSYNC. In other embodiments, the "external synchronization time points" may refer to falling edge time points of the external horizontal synchronization signal EXT_HSYNC.

Generally, as long as the vertical synchronization information VSS and the external horizontal synchronization signal EXT_HSYNC are not aligned, i.e., if there is a skew between the vertical synchronization information VSS and the external horizontal synchronization signal EXT_HSYNC, the display driving IC 120 may not be able to receive image frames properly. A left portion of FIG. 3 illustrates a skew1 between the vertical synchronization information VSS and the external horizontal synchronization signal EXT_HSYNC. The display driving IC 120 is required to process the external horizontal synchronization signal EXT_HSYNC to generate an internal horizontal synchronization signal Int_Hs that matches the vertical synchronization information VSS and the horizontal synchronization information HSS. Based on the internal horizontal synchronization signal Int_Hs whose phase matches the phase of the horizontal synchronization information HSS, the driving circuit 123 may correctly sample/latch the display frame data AP_D2

However, due to one or more reasons, the skew between the synchronization information (VSS and HSS) of each display frame and the external horizontal synchronization signal EXT_HSYNC may not be constant. For instance, after the processor 110 performs MIPI hopping, the skew between the synchronization information and the external horizontal synchronization signal EXT_HSYNC may be changed. Alternatively, when the processor 110 performs MIPI mode switching, such as switching between an MIPI command mode and the MIPI video mode, the skew between the synchronization information and the external horizontal synchronization signal EXT_HSYNC may also be changed. Alternatively, interference resulting from electrostatic discharge (ESD) may change the skew between the synchronization information and the external horizontal synchronization signal EXT_HSYNC. A right portion of FIG. 3 shows a skew2 between the vertical synchronization information VSS and the external horizontal synchronization signal EXT_HSYNC. Due to one or more reasons, the skew1 between the synchronization information and the external horizontal synchronization signal EXT_HSYNC in the previous display frame may be different from the skew2 between the synchronization information and the external horizontal synchronization signal EXT_HSYNC in the subsequent display frame. Because the skew between the synchronization information (VSS and HSS) and the external horizontal synchronization signal EXT_HSYNC may not be constant, even if the display driving IC 120 has performed compensation based on the skew1, the compensation based on the skew1 may not be applicable to the skew2 in the subsequent display frame.

Figure 4:
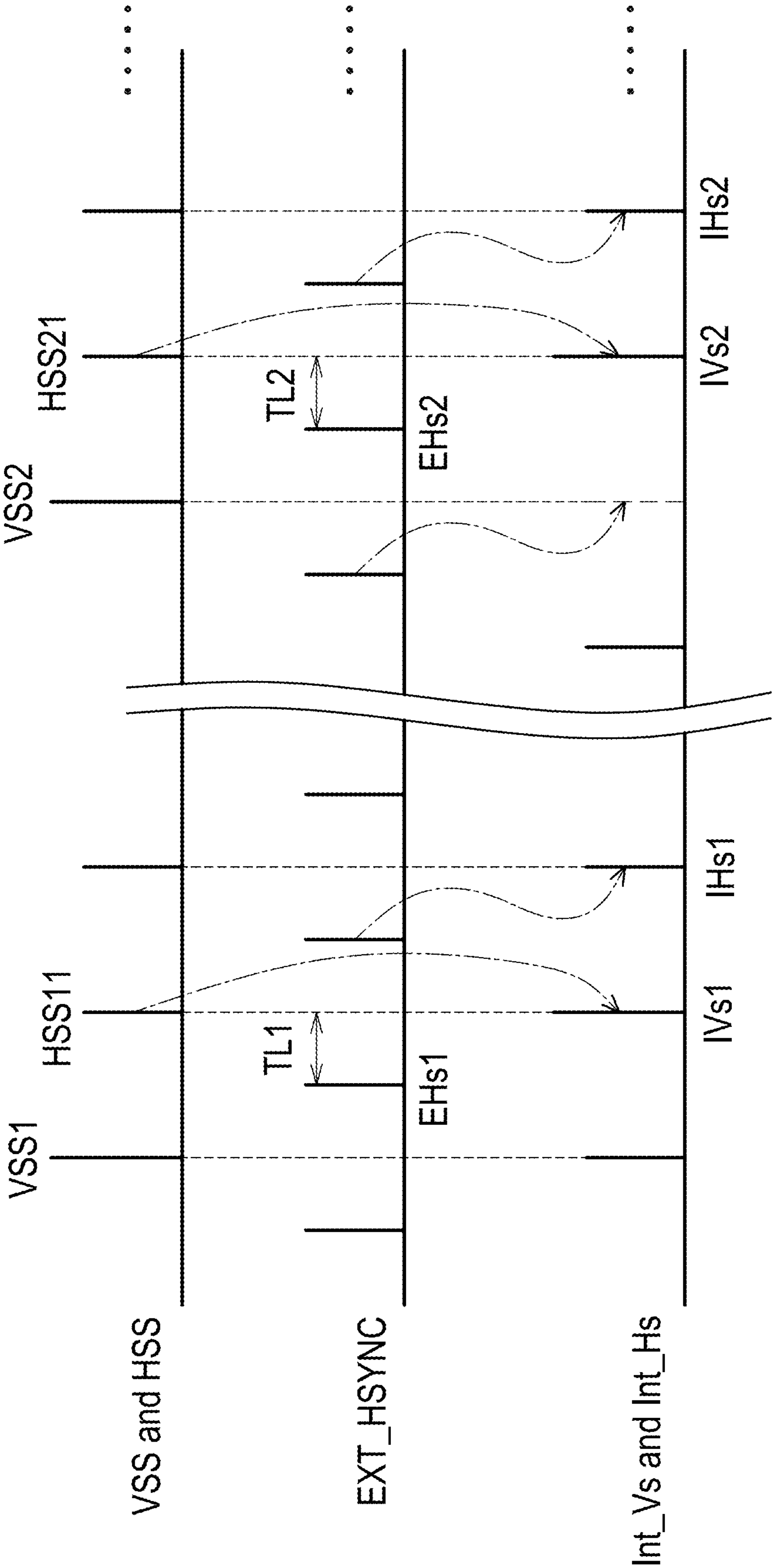
FIG. 4 is a schematic timing/phase view of vertical synchronization information, horizontal synchronization information, an external horizontal synchronization signal, an internal vertical synchronization signal, and an internal horizontal synchronization signal according to an embodiment of the disclosure.

FIG. 4 is a schematic timing/phase view of the vertical synchronization information VSS, the horizontal synchronization information HSS, the external horizontal synchronization signal EXT_HSYNC, the internal vertical synchronization signal Int_Vs, and the internal horizontal synchronization signal Int_Hs according to an embodiment of the disclosure. With reference to FIG. 1 and FIG. 4, an upper portion of FIG. 4 illustrates the vertical synchronization time points of the vertical synchronization information VSS and the horizontal synchronization time points of the horizontal synchronization information HSS, where the longer vertical lines represent the "vertical synchronization time points" of the vertical synchronization information VSS, and the shorter vertical lines represent the "horizontal synchronization time points" of the horizontal synchronization information HSS. The "vertical synchronization time points" may be time points where the vertical sync start markers defined by the MIPI standard are located. FIG. 4 shows the vertical synchronization time points VSS1 and VSS2 of the vertical synchronization information VSS, and the vertical synchronization time points VSS1 and VSS2 of the vertical synchronization information VSS define one display frame. The "horizontal synchronization time points" (e.g., horizontal synchronization time points HSS11 and HSS21 shown in FIG. 4) may refer to time points where the horizontal sync start markers defined by the MIPI standard are located.

A middle portion of FIG. 4 illustrates a plurality of external synchronization time points of the external horizontal synchronization signal EXT_HSYNC, where the "external synchronization time points" (e.g., external synchronization time points EHs1 and EHs2 shown in FIG. 4) are represented by vertical lines. According to the actual design, in some embodiments, the "external synchronization time points" may refer to the rising edge time points of the external horizontal synchronization signal EXT_HSYNC. In other embodiments, the "external synchronization time points" may refer to the falling edge time points of the external horizontal synchronization signal EXT_HSYNC. As provided in the related descriptions depicted in FIG. 3, due to one or more reasons, there may be a skew between the synchronization information VSS and HSS and the external horizontal synchronization signal EXT_HSYNC, and the skew between the synchronization information VSS and HSS and the external horizontal synchronization signal EXT_HSYNC in each display frame may not be constant. If the display driving IC 120 directly uses the external horizontal synchronization signal EXT_HSYNC to sample/latch the display frame data AP_D2, the data sampled by the display driving IC 120 may be incorrect.

A lower portion of FIG. 4 illustrates the internal vertical synchronization time points of the internal vertical synchronization signal Int_Vs and the internal horizontal synchronization time points of the internal horizontal synchronization signal Int_Hs, where the longer vertical lines represent the "internal vertical synchronization time points" of the internal vertical synchronization signal Int_Vs, and the shorter vertical lines represent the "internal horizontal synchronization time points" of the internal horizontal synchronization signal Int_Hs. According to the actual design, in some embodiments, the "internal vertical synchronization time points" and the "internal horizontal synchronization time points" may refer to the rising edge time points of the internal vertical synchronization signal Int_Vs and the internal horizontal synchronization signal Int_Hs. In other embodiments, the "internal vertical synchronization time points" and the "internal horizontal synchronization time points" may refer to the falling edge time points of the internal vertical synchronization signal Int_Vs and the internal horizontal synchronization signal Int_Hs.

The synchronization signal generating circuit 122 may inspect the synchronization time point (e.g., a vertical synchronization time point VSS1 shown in FIG. 4) belonging to the current frame in the vertical synchronization information VSS. After the occurrence of the vertical synchronization time point VSS1, the synchronization signal generating circuit 122 may inspect the first horizontal synchronization time point following the vertical synchronization time point VSS1 in the external horizontal synchronization signal EXT_HSYNC (e.g., the external synchronization time point EHs1 shown in FIG. 4), and inspect the first horizontal synchronization time point following the vertical synchronization time point VSS1 in the horizontal synchronization information HSS (e.g., the horizontal synchronization time point HSS11 shown in FIG. 4). The synchronization signal generating circuit 122 may generate a vertical synchronization time point IVs1 in the internal vertical synchronization signal Int_Vs based on the horizontal synchronization time point HSS11.

The synchronization signal generating circuit 122 may count a duration TL1 from the external synchronization time point EHs1 to the horizontal synchronization time point HSS11 and dynamically update a delay value of the current frame based on the duration TL1. Next, the synchronization signal generating circuit 122 may delay the external horizontal synchronization signal EXT_HSYNC based on the updated delay value (i.e., the delay value corresponding to the duration TL1) to generate a plurality of horizontal synchronization points (e.g., the horizontal synchronization point IHs1 shown in FIG. 4) in the current frame in the internal horizontal synchronization signal Int_Hs. The occurrence of the vertical synchronization time point VSS2 indicates the end of the current frame and the beginning of the next frame.

Similarly, the synchronization signal generating circuit 122 may count a duration TL2 from the external synchronization time point EHs2 (the first horizontal synchronization time point following the vertical synchronization time point VSS2 in the external horizontal synchronization signal EXT_HSYNC) to the horizontal synchronization time point HSS21 (the first horizontal synchronization time point following the vertical synchronization time point VSS2 in the horizontal synchronization information HSS) and dynamically update the delay value based on the duration TL2. The synchronization signal generating circuit 122 may generate a vertical synchronization time point IVs2 in the internal vertical synchronization signal Int_Vs based on the horizontal synchronization time point HSS21 and delay the external horizontal synchronization signal EXT_HSYNC based on the updated delay value (i.e., the delay value corresponding to the duration TL2) to generate a plurality of horizontal synchronization time points (e.g., a horizontal synchronization time point IHs2 shown in FIG. 4) in the internal horizontal synchronization signal Int_Hs.

Therefore, the update of the delay value of the current frame is independent from the update of the previous delay value of the previous frame. The display driving IC 120 may dynamically update the delay value of the internal horizontal synchronization signal Int_Hs based on the phase relationship between the horizontal synchronization information HSS and the external horizontal synchronization signal EXT_HSYNC, thereby matching the phase of the internal horizontal synchronization signal Int_Hs to the phase of the horizontal synchronization information HSS provided by the processor 110. Based on the internal horizontal synchronization signal Int_Hs whose phase matches the phase of the horizontal synchronization information HSS, the driving circuit 123 may correctly sample/latch the display frame data AP_D2.

However, due to one or more reasons, such as the interference from the ESD or other factors, the MIPI horizontal sync start marker may be lost. For instance, a horizontal synchronization time point HSS21 (the horizontal sync start marker) may not exist. In the absence of the horizontal synchronization time point HSS21, the duration TL2 counted by the synchronization signal generating circuit 122 is inaccurate. If the duration TL2 exceeds a certain threshold duration, the synchronization signal generating circuit 122 may discard the currently counted duration TL2. Instead, the synchronization signal generating circuit 122 retains the previous delay value of the previous frame (e.g., the delay value corresponding to the duration TL1) as the delay value of the current frame. The threshold duration may be any real number determined according to the actual design.

Due to one or more reasons, such as the interference from the ESD or other factors, one or more pulses of the external horizontal synchronization signal EXT_HSYNC may be lost. For instance, an external synchronization time point EHs2 (a pulse of the external horizontal synchronization signal EXT_HSYNC) between the vertical synchronization time point VSS2 and the horizontal synchronization time point HSS21 may not exist. In the absence of the external synchronization time point EHs2 between the vertical synchronization time point VSS2 and the horizontal synchronization time point HSS21, the synchronization signal generating circuit 122 may retain the previous delay value of the previous frame (e.g., the delay value corresponding to the duration TL1) as the delay value of the current frame.

Although the disclosure has been described above through embodiments, the embodiments do not serve to pose any limitation in the disclosure. Those with ordinary knowledge in the pertinent technical field are able to make some modifications to the disclosed embodiments without departing from the spirit and scope of the disclosure, and therefore the protection scope provided in the disclosure shall be determined by the following claims and their equivalents.

What is claimed is:

1. A display driving integrated circuit, comprising:

an interface circuit, receiving a data stream and an external horizontal synchronization signal from a processor, wherein the data stream comprises display frame data, vertical synchronization information, and horizontal synchronization information;

a synchronization signal generating circuit, coupled to the interface circuit to receive the vertical synchronization information, the horizontal synchronization information, and the external horizontal synchronization signal, wherein the synchronization signal generating circuit generates an internal vertical synchronization signal based on the vertical synchronization information and the horizontal synchronization information, the synchronization signal generating circuit dynamically updates a delay value based on a phase relationship among the vertical synchronization information, the horizontal synchronization information, and the external horizontal synchronization signal, and the synchronization signal generating circuit delays the external horizontal synchronization signal based on the delay value to generate an internal horizontal synchronization signal; and a driving circuit, coupled to the interface circuit to receive the display frame data and coupled to the synchronization signal generating circuit to receive the internal vertical synchronization signal and the internal horizontal synchronization signal, wherein the driving circuit drives a display panel based on the display frame data, the internal vertical synchronization signal, and the internal horizontal synchronization signal.

2. The display driving integrated circuit according to claim 1, wherein the interface circuit receives the data stream from the processor through a mobile industry processor interface.

3. The display driving integrated circuit according to claim 1, wherein the synchronization signal generating circuit counts a duration from an external synchronization time point to a horizontal synchronization time point, the external synchronization time point is a first horizontal synchronization time point following a vertical synchronization time point in the external horizontal synchronization signal, the vertical synchronization time point is a synchronization time point belonging to a current frame in the vertical synchronization information, the horizontal synchronization time point is a first horizontal synchronization time point following the vertical synchronization time point in the horizontal synchronization information, and the synchronization signal generating circuit dynamically updates the delay value of the current frame based on the duration.

4. The display driving integrated circuit according to claim 3, wherein in response to the duration exceeding a threshold duration, the synchronization signal generating circuit discards the duration and retains a previous delay value of a previous frame before the current frame as the delay value of the current frame.

5. The display driving integrated circuit according to claim 3, wherein in response to an absence of the external synchronization time point between the vertical synchronization time point and the horizontal synchronization time point, the synchronization signal generating circuit retains a previous delay value of a previous frame before the current frame as the delay value of the current frame.

6. The display driving integrated circuit according to claim 1, wherein the update of the delay value of a current frame is independent from an update of a previous delay value of a previous frame before the current frame.

7. An operating method of a display driving integrated circuit, comprising:

receiving a data stream and an external horizontal synchronization signal from a processor by an interface circuit of the display driving integrated circuit, wherein the data stream comprises display frame data, vertical synchronization information, and horizontal synchronization information;

generating an internal vertical synchronization signal based on the vertical synchronization information and the horizontal synchronization information by a synchronization signal generating circuit of the display driving integrated circuit;

dynamically updating a delay value based on a phase relationship among the vertical synchronization information, the horizontal synchronization information, and the external horizontal synchronization signal by the synchronization signal generating circuit;

delaying the external horizontal synchronization signal based on the delay value by the synchronization signal generating circuit to generate an internal horizontal synchronization signal; and driving a display panel based on the display frame data, the internal vertical synchronization signal, and the internal horizontal synchronization signal by a driving circuit of the display driving integrated circuit.

8. The operating method according to claim 7, wherein the interface circuit receives the data stream from the processor through a mobile industry processor interface.

9. The operating method according to claim 7, further comprising:

counting a duration from an external synchronization time point to a horizontal synchronization time point, wherein the external synchronization time point is a first horizontal synchronization time point following a vertical synchronization time point in the external horizontal synchronization signal, the vertical synchronization time point is a synchronization time point belonging to a current frame in the vertical synchronization information, and the horizontal synchronization time point is a first horizontal synchronization time point following the vertical synchronization time point in the horizontal synchronization information; and dynamically updating the delay value of the current frame based on the duration.

10. The operating method according to claim 9, further comprising:

in response to the duration exceeding a threshold duration, discarding the duration and retaining a previous delay value of a previous frame before the current frame as the delay value of the current frame.

11. The operating method according to claim 9, further comprising:

in response to an absence of the external synchronization time point between the vertical synchronization time point and the horizontal synchronization time point, retaining a previous delay value of a previous frame before the current frame as the delay value of the current frame.

12. The operating method according to claim 7, wherein the update of the delay value of a current frame is independent from an update of a previous delay value of a previous frame before the current frame.

13. A display device, comprising:

a processor;

a display driving integrated circuit, coupled to the processor to receive a data stream and an external horizontal synchronization signal, wherein the data stream comprises display frame data, vertical synchronization information, and horizontal synchronization information, the display driving integrated circuit generates an internal vertical synchronization signal based on the vertical synchronization information and the horizontal synchronization information, the display driving integrated circuit dynamically updates a delay value based on a phase relationship among the vertical synchronization information, the horizontal synchronization information, and the external horizontal synchronization signal, and the display driving integrated circuit delays the external horizontal synchronization signal based on the delay value to generate an internal horizontal synchronization signal; and a display panel, coupled to the display driving integrated circuit, wherein the display driving integrated circuit drives the display panel based on the display frame data, the internal vertical synchronization signal, and the internal horizontal synchronization signal.

14. The display device according to claim 13, wherein the display driving integrated circuit comprises:

an interface circuit, receiving the data stream and the external horizontal synchronization signal from the processor;

a synchronization signal generating circuit, coupled to the interface circuit to receive the vertical synchronization information, the horizontal synchronization information, and the external horizontal synchronization signal, wherein the synchronization signal generating circuit generates the internal vertical synchronization signal based on the vertical synchronization information and the horizontal synchronization information, the synchronization signal generating circuit dynamically updates the delay value based on the phase relationship among the vertical synchronization information, the horizontal synchronization information, and the external horizontal synchronization signal, and the synchronization signal generating circuit delays the external horizontal synchronization signal based on the delay value to generate the internal horizontal synchronization signal; and a driving circuit, coupled to the interface circuit to receive the display frame data and coupled to the synchronization signal generating circuit to receive the internal vertical synchronization signal and the internal horizontal synchronization signal, wherein the driving circuit drives the display panel based on the display frame data, the internal vertical synchronization signal, and the internal horizontal synchronization signal.

15. The display device according to claim 14, wherein the interface circuit receives the data stream from the processor through a mobile industry processor interface.

16. The display device according to claim 14, wherein the synchronization signal generating circuit counts a duration from an external synchronization time point to a horizontal synchronization time point, the external synchronization time point is a first horizontal synchronization time point following a vertical synchronization time point in the external horizontal synchronization signal, the vertical synchronization time point is a synchronization time point belonging to a current frame in the vertical synchronization information, the horizontal synchronization time point is a first horizontal synchronization time point following the vertical synchronization time point in the horizontal synchronization information, and the synchronization signal generating circuit dynamically updates the delay value of the current frame based on the duration.

17. The display device according to claim 16, wherein in response to the duration exceeding a threshold duration, the synchronization signal generating circuit discards the duration and retains a previous delay value of a previous frame before the current frame as the delay value of the current frame.

18. The display device according to claim 16, wherein in response to an absence of the external synchronization time point between the vertical synchronization time point and the horizontal synchronization time point, the synchronization signal generating circuit retains a previous delay value of a previous frame before the current frame as the delay value of the current frame.

19. The display device according to claim 14, wherein the update of the delay value of a current frame is independent from an update of a previous delay value of a previous frame before the current frame.

20. A synchronization signal generating method, comprising:

receiving a vertical synchronization signal and a horizontal synchronization signal pertaining to a first frame;

receiving an external horizontal synchronization signal;

counting, after the vertical synchronization signal, the time interval between the first pulse of the horizontal synchronization signal and the first pulse of the external horizontal synchronization signal, provided that the vertical synchronization signal is not aligned with the external horizontal synchronization signal; and delaying the external horizontal synchronization signal by the duration to generate an internal horizontal synchronization signal.

* * * * *